(12) United States Patent
Bech

(10) Patent No.: US 9,376,923 B2
(45) Date of Patent: Jun. 28, 2016

(54) CHORDWISE LAY-UP OF FIBRE SHEET MATERIAL FOR TURBINE BLADES

(75) Inventor: Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/232,149

(22) PCT Filed: Jul. 9, 2012

(86) PCT No.: PCT/DK2012/050261
§ 371 (c)(1),
(2), (4) Date: Jan. 10, 2014

(87) PCT Pub. No.: WO2013/007263
PCT Pub. Date: Jan. 17, 2013

(65) Prior Publication Data
US 2014/0170369 A1  Jun. 19, 2014

Related U.S. Application Data

(60) Provisional application No. 61/508,076, filed on Jul. 15, 2011.

(30) Foreign Application Priority Data

Jul. 13, 2011  (DK) .................. 2011 70379

(51) Int. Cl.
*F01D 5/28* (2006.01)
*B32B 3/02* (2006.01)
(Continued)

(52) U.S. Cl.
CPC ............. *F01D 5/282* (2013.01); *B23P 15/04* (2013.01); *B29C 70/202* (2013.01); *B29C 70/30* (2013.01);
(Continued)

(58) Field of Classification Search
CPC ... F01D 5/282; F01D 5/0675; F05B 2230/50; F05B 2250/313; F05B 2280/6003; B23P 15/04; B32B 5/024; B32B 3/02; B32B 5/26; B29C 70/30; B29C 70/202; B29C 70/545; B29L 2031/085; Y10T 478/2476; Y10T 428/24124
See application file for complete search history.

(56) References Cited

U.S. PATENT DOCUMENTS

| 5,766,725 A | 6/1998 | Hogenboom et al. | |
|---|---|---|---|
| 2006/0172636 A1* | 8/2006 | Bech .............................. | 442/1 |
| 2010/0227117 A1 | 9/2010 | Dan-Jumbo et al. | |

FOREIGN PATENT DOCUMENTS

| EP | 0606830 A1 | 7/1994 |
|---|---|---|
| GB | 2151185 A | 7/1985 |

(Continued)

OTHER PUBLICATIONS

Michael C. Niu; Composite Airframe Structures, Practical Design Information and Data; Dec. 31, 1992; pp. 195-206.*

(Continued)

*Primary Examiner* — David Bryant
*Assistant Examiner* — Lee A Holly
(74) *Attorney, Agent, or Firm* — Wood, Herron & Evans, LLP

(57) ABSTRACT

The present invention relates to a fibre sheet material and method of laying up fibre sheet material to manufacture wind turbine blades. The invention further comprises a blade manufactured by the method as well a use of such a blade. One aspect relates to an oblong fibre sheet material (26) for wind turbine blades, where a surface layer (14) is having a width, which in the lateral direction is broader than a lateral, unidirectional layer (10), and lengthwise side faces of at least the surface layer is provided with a thinning of a thickness of the layer to obtain favourable joints. Another aspect concerns manufacturing a wind turbine blade shell comprising laying fibre sheet (26) materials in a blade mould (20), where the sheet materials lengthwise are positioned in a direction corresponding to a chordwise direction of a turbine blade direction of the mould and overlapping in a spanwise direction. The effect obtained is a significant reduction in the amount of waste material compared to laying fibre sheets in the spanwise direction.

13 Claims, 6 Drawing Sheets

(51) Int. Cl.
  *B32B 3/26* (2006.01)
  *B32B 5/26* (2006.01)
  *F03D 1/06* (2006.01)
  *B29C 70/54* (2006.01)
  *B29C 70/20* (2006.01)
  *B29C 70/30* (2006.01)
  *B32B 5/02* (2006.01)
  *B23P 15/04* (2006.01)
  *B29L 31/08* (2006.01)

(52) U.S. Cl.
  CPC ............... *B29C 70/545* (2013.01); *B32B 3/02* (2013.01); *B32B 3/263* (2013.01); *B32B 5/024* (2013.01); *B32B 5/26* (2013.01); *F03D 1/0675* (2013.01); *B29L 2031/085* (2013.01); *F05B 2230/50* (2013.01); *F05B 2250/313* (2013.01); *F05B 2280/6003* (2013.01); *Y02E 10/721* (2013.01); *Y02P 70/523* (2015.11); *Y10T 29/49337* (2015.01); *Y10T 428/2476* (2015.01); *Y10T 428/24124* (2015.01)

(56) References Cited

FOREIGN PATENT DOCUMENTS

WO        2004078443 A1    9/2004
WO        2006015598 A1    2/2006
WO     WO 2011029882 A2 *  3/2011

OTHER PUBLICATIONS

European Patent Office, Official Action issued in Application No. 12 737 475.9 dated May 18, 2015.

Michael C. Niu, "Laminated Design Practices", Composite Airframe Structures, Practical Design Information and Data, Dec. 31, 1992, pp. 383-392 HK.

International Searching Authority, Search Report and Written Opinion issued in corresponding International Application No. PCT/DK2012/050261 mailed Jan. 18, 2013, 13 pages.

Danish Patent Office, Combined Search and Examination Report issued in corresponding DK Patent Application No. PA 2011 70379 date Feb. 22, 2012, 6 pages.

European Patent Office, Official Action issued in Application No. 12 737 475.9 dated Mar. 2, 2016.

Michael C. Niu, Composite Airframe Structures, Practical Design Information and Data, In: Composite Airframe Structures, Practical Design Information and Data, Dec. 31, 1992, Hong Kong Conmilit Press Limited, pp. 195-206.

Singer Gardiner, Wind Blade Manufacturing, Part I: M and P Innovations Optimize Production: CompositesWorld, Nov. 30, 2008, Retrieved from the internet: URL:http://www.compositesworld.com/articles/wind-blade-manufacturing-part-i-m-and-p-innovations optimize-production [retrieved on Feb. 23, 2016].

* cited by examiner

CHORDWISE LAY-UP OF FIBRE SHEET MATERIAL FOR TURBINE BLADES

TECHNICAL FIELD

The present invention relates to a fibre sheet material and method of laying up fibre sheet material to manufacture fibre reinforced composite products, such as in this case, in particular wind turbine blades. The invention further comprises a blade manufactured by the method as well as a use of such a blade.

BACKGROUND OF THE INVENTION

FIG. 1 illustrates a wind turbine 1. The wind turbine comprises a wind turbine tower 2 on which a wind turbine nacelle 3 is mounted. A wind turbine rotor 4 comprising at least one wind turbine blade 5 is mounted on a hub 6. The hub 6 is connected to nacelle 3 through a low speed shaft (not shown) extending from the nacelle front. The wind turbine illustrated in FIG. 1 may be a small model intended for domestic or light utility usage, or may be a large model, such as those that are used in large scale electricity generation or on a wind farm for example. In the latter case, the diameter of the rotor could be as large as 100 metres or more.

When building the structure of a wind turbine blade, where the structure mainly comprises fibre material and resin, in either a prepreg or infusion process, it is important to have a certain amount of fibres laying in a longitudinal direction of the blade to provide strength and stiffness in flapwise bending of the blade. Fibres are also needed in other directions to deal with twisting of the blade and general structural requirements.

Presently, e.g tri-axial fibre sheets are laid in the lengthwise direction on the blade, where at least one layer of fibres, normally the warp direction of a tri-axial fabric, is laid substantially parallel with the lengthwise direction of a blade or parallel to the leading edge or the trailing edge to actually provide the aforementioned strength and stiffness in flapwise bending.

However, due to the shape of the blade, which is very broad in the area around where maximum chord is located and very pointy at the tip of the blade, there is a massive amount of material waste when the sheets of uniform width are cut to conform to such a shape. This is because the sheets used are normally produced on a machine, which mass produces the sheet material, which after fabrication is rolled up to form large rolls of the sheet material. Often the precise cutting of the sheet material to be located in a certain position is done prior to the actual use of the sheet material, which increases lay-up speed, but at the same time increases material waste.

Retrieving the cut away material by splicing it to form a usable material has not been found feasible, as joints, like cut and overlay ends, have not shown proper strength performance. The typical joint shows only 50-60% strength of the original material strength.

SUMMARY OF THE INVENTION

A first object of the invention is to avoid or minimize the aforementioned amount of material waste. By laying the material laterally in the mould instead of lengthwise the amount of waste is minimized. This is because when laying the sheet material in the mould, from the part which shapes the leading edge of the blade toward the part forming the trailing edge of the blade, and laying a next sheet of material overlapping the formerly laid sheet, from the part of the mould, which shapes the trailing edge of the blade, and towards the part of the mould shaping the leading edge of the blade, then the cutting angle of the formerly laid sheet nearly, but not completely, equals the required angle for the next laid sheet in order to conform to the mould. Hence, only a minimal amount of trimming of the next layer is required, whereby the amount of waste sheet material is greatly reduced. And of course, the same effect is present when laying an additional sheet from the part of the mould shaping the leading edge of the blade towards the part of the mould shaping the trailing edge of the blade.

Other objects appear from the description, claims and appended Figures.

In a first aspect comprised by the invention, an oblong fibre sheet material for wind turbine blades, the fibre sheet material having a lengthwise direction and a lateral direction, where the fibre sheet material comprises multiple stacked fibre layers and having a surface layer, where at least one other fibre layer is a unidirectional layer, and the unidirectional layer is having mainly fibres in the lateral direction, and where each layer has lengthwise side faces, and where the surface layer is having a width, which in the lateral direction is broader than the unidirectional layer, and where the unidirectional layer is positioned relative to the surface layer such that the surface layer overlaps the unidirectional layer at both lengthwise side faces of the unidirectional layer, and where the lengthwise side faces of at least the surface layer are provided with a thinning of a thickness of the layer.

The lateral, unidirectional layer enables a positioning of the fibre sheet in a casting mould for turbine blades in a chordwise direction such that the unidirectional fibres extend in the spanwise direction of the mould. When e.g., tri-axial fabrics are laid chordwise, the unidirectional fibres in the warp direction in a tri-axial fabric must be alternated to a layer of weft fibres and the strength of the overlays at the edges of the fabrics must be improved. Fibre layer edges are with the chordwise layup perpendicular in the spanwise direction of the blade. Due to this, the loads in the blade shell from flapwise flexures are transferred through the overlap of the fibre layer edges from one to the next etc. The strength of these overlaps is hence critical. A simple overlay of the edge of one web onto the other is not appropriate as strength is reduced to 50-60% of the general strength. An improvement of the overlap joint to have less strength reduction is therefore needed. Forming the fibre layer edges from a blunt full thickness edge into an edge, which progressively gets thinner towards the edge, the overlap joint created at overlapping two layer edges are changed from being a simple overlap joint to a scarf joint which has far better stress retention. The reduction of the layer thickness can take different forms. One way is a linear taper between full thicknesses to final edge. Another is to stagger the width of the individual fibre layers in the web so the thickness of the web is stepped down towards the edge. A third way is an improvement to the edges in the staggered layers by defusing the edge of each individual layers in order to reduce their stress concentrations at the edge of the individual fibre layers.

In preferred embodiments the lengthwise side faces the surface layer and/or the lateral, unidirectional layer and/or all the fibre layers are frayed, crushed, grinded, tapered or cut to provide the thinning of a thickness of the layer or layers. The thinning is as aforementioned explained indeed important to reduce stress concentrations when the fibre sheets overlap.

In another embodiment the surface layer may be a woven layer of bi-axial fibres. To apply also the lateral, unidirectional layer, all layers may be sewn together with a thin fibre or filament.

In a further embodiment, the fibre sheet material may comprise a further fibre layer positioned on the unidirectional, lateral layer, where the unidirectional layer is broader than the further fibre layer. Using several layers of decreasing width enables an overlap between two sheets of fibre material, where a gradual thickness can be obtained at the overlap, which, when the side faces of the fibre layers are thinned, increases the strength at the overlap without causing a high stress concentration.

In other embodiments the surface layer may mainly comprise fibres in a unidirectional direction, which is different from the lateral unidirectional layer. Hence, strength is obtained in more than one direction. Also, the further fibre layer may have mainly fibres in a unidirectional direction, which is different from a unidirectional layer of the surface layer. Hereby strength is obtained in an even further direction. Again the layers may be sewn together, preferably using a thin fibre or fibre filament.

Fibre filament for sewing may be made from polyester, which is of low stiffness and hence make the fibre sheet easier to adapt to a certain mould shape.

Also, the unidirectional layer of the further fibre layer and the unidirectional fibre layer of the surface layer are placed in symmetrical angles relative to the lengthwise direction. This balances the fibre sheet material in relation to flapwise bending of a blade, although the blade is normally twisted from tip to root end approx. 15-10 degrees, which induce a certain amount of twisting torque under flapwise bending.

In a further preferred embodiment the fibre sheet material may be a tri-axial fibre material and even more preferred, the tri-axial fibre material is having angles of +45°/−45°/90° or −45°/+45°/90° corresponding to the warp direction of sheet in a roll. Hereby the sheet is balanced against twisting and the lateral 90 degree layer is protected by two other layers.

Preferably, the sheet material is arranged on a roll in order to easily move it back and forth across the mould. Of course, the sheet material may also be pre-cut to be more handy.

A second aspect of the invention comprises a method of manufacturing a wind turbine blade aerodynamic surface shell comprising laying fibre sheet materials, where the sheet materials are positioned so that their own lengthwise direction corresponds to a chordwise direction of a turbine blade direction of the mould and overlapping in a spanwise direction, and where at least two fibre sheets have the surface layers facing the mould. By laying the material chordwise instead of lengthwise the amount of waste is minimized. This is because when laying the sheet material in the mould, from the part which shapes the leading edge of the blade towards the part forming the trailing edge of the blade, and laying a next sheet of material overlapping the formerly laid sheet, from the part of the mould, which shapes the trailing edge of the blade, and towards the part of the mould shaping the leading edge of the blade, then the cutting angle of the formerly laid sheet nearly, but not completely, equals the required angle for the next laid sheet in order to conform to the mould. Hence, only a minimal amount of trimming of the next layer is required, whereby the amount of waste sheet material is greatly reduced. And of course, the same effect is present when laying an additional sheet from the part of the mould shaping the leading edge of the blade towards the part of the mould shaping the trailing edge of the blade.

In a preferred embodiment a first fibre sheet is laid from a side of the mould, which is adapted to shape a leading edge of a turbine blade, and towards the opposite side of the mould, which is adapted to shape a trailing edge of a blade, where the sheet material is cut to conform to the mould, and where a side of the sheet, which was cut to conform to the mould, is laid as a second sheet from the part of the mould, which is adapted to shape a trailing edge of a blade, and towards the opposite side of the mould, which is adapted to shape a leading edge of a blade. Hereby, when the sheet material is cut, it is cut at an angle adapted to the trailing edge, it will almost conform to an angle of adjacent position of the trailing edge. Hereby, again a significant amount of waste sheet material may be avoided.

Also, the fibre sheet may be cut to conform to the mould, which is adapted to shape the trailing edge of the blade. The edge of the mould which is adapted to shape the trailing edge is much more angled than the portion of the mould shaping the leading edge, whereby the highest decrease in waste is obtained by the portion of the mould which is adapted to shape the trailing edge.

To obtain sufficient strength of the joints/overlap, at least two fibre sheets may be positioned spanwise in a way where at least the lateral, unidirectional layer of each sheet and another sheet are positioned overlapping an adjacent lateral, unidirectional layer and another layer in a spanwise direction. In this way, e.g. when the sheet is a tri-axial sheet instead of 2×3 layers at the overlap, only 2×2 may be used, which provides sufficient strength of the overlap as 2×2, which is 4, is more than 3.

In another preferred embodiment the two overlapping fibre sheets may comprise an uneven number of fibre layers, and the fibre layers be positioned so that at least a number of fibre layers corresponding to the sheet with a minimum number of fibre or more layers are present from both overlapping fibre sheets in a position of overlapping. Hereby it is possible to also use the method to obtain the so-called ply-drops which is a common feature on turbine blades due to decrease in cross-section from the root end to the tip.

The invention also provides a method of manufacturing a wind turbine blade aerodynamic surface shell.

Other aspects of the invention comprise a blade for a wind turbine manufactured by a method or a sheet material as described above as well as a use of such a blade wind turbine according to FIG. 1.

DETAILED DESCRIPTION OF THE INVENTION

Figure 1:
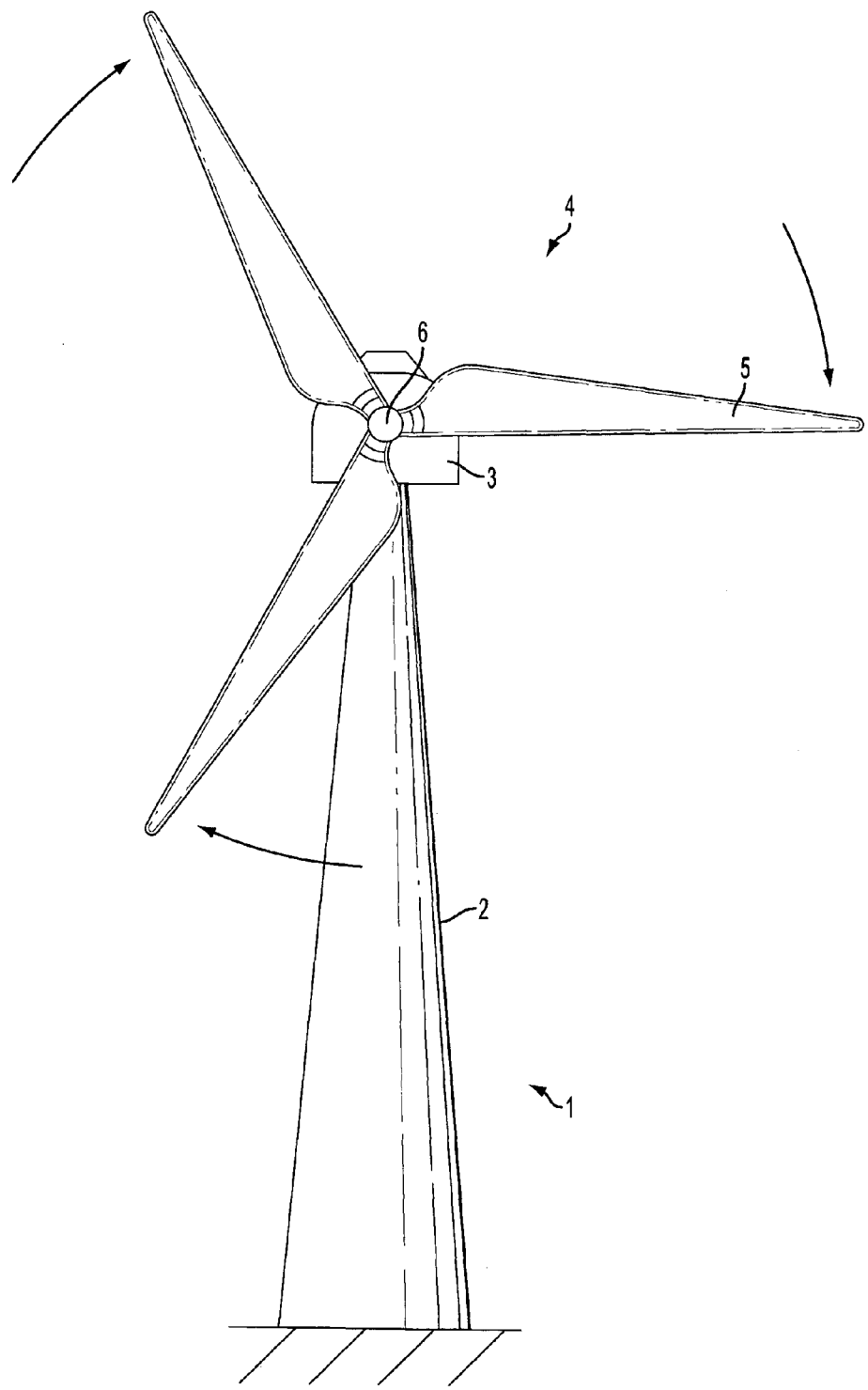
FIG. 1 shows a wind turbine including classical components and seen from a direction where the rotor is facing incoming wind.

With reference to FIG. 1, the present invention relates to materials, manufacture etc. of a blade for a wind turbine 1.

Figure 2:
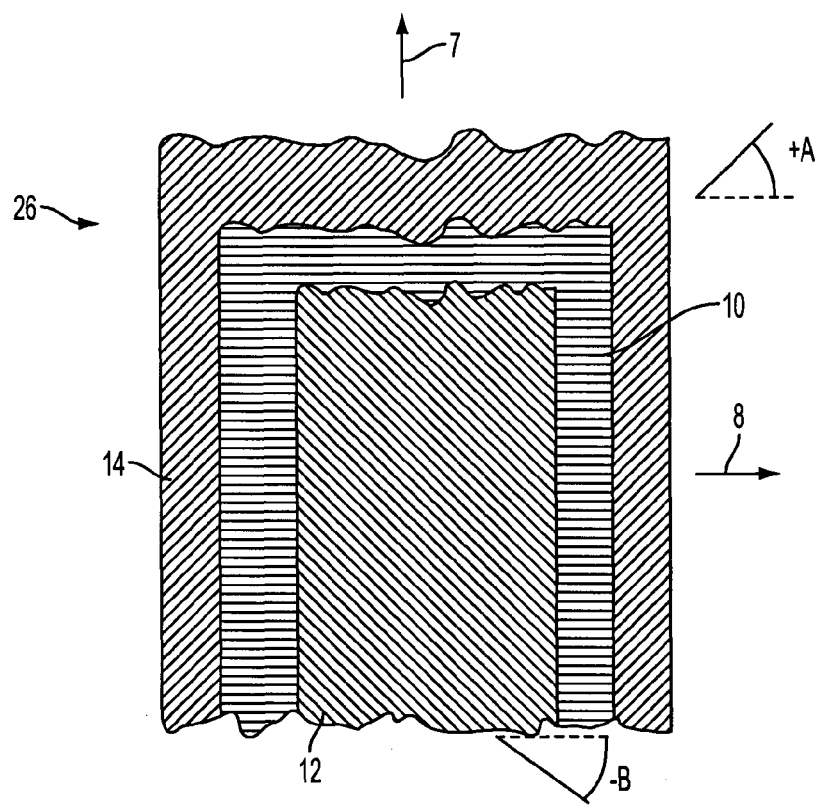
FIG. 2 shows a fibre sheet material according to the invention seen from above.
Figure 4:
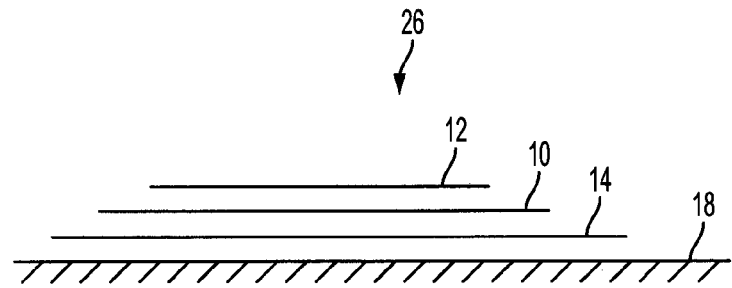
FIG. 4 shows a lateral cross-sectional view of a fibre sheet of FIG. 2.

FIG. 2 shows an oblong fibre sheet material 26 for wind turbine blades, the fibre sheet material having a lengthwise direction 7 and a lateral direction 8. The sheet 26 comprises three stacked fibre layers 10, 12, 14, where the layer 14 is a surface layer and a lateral fibre layer 10 is a unidirectional layer, which has mainly fibres in the lateral direction 8. Each layer 10, 12, 14 has lengthwise side faces going in the lengthwise direction 7. The surface layer 14 is having a width, which in the lateral direction is broader than the lateral, unidirectional layer 10. The unidirectional layer 10 is positioned relative to the surface layer 14 such that the surface layer 14 overlaps the unidirectional layer 10 at both lengthwise side faces of the unidirectional layer. The lateral, unidirectional fibre layer 10 is placed on top of the surface layer 14, which is broader than the lateral, unidirectional layer 10. The layer 10 is broader than the layer 12. This is also shown in FIG. 4, where the sheet 26 is placed on a mould surface 18.

The lengthwise side faces of the surface layer 14 are provided with a thinning of a thickness (not shown) of the layer. Both the fibre layers 12 and 14 are mainly unidirectional, the layer 14 having a main direction at an angle +A and the layer 12 a main direction at an angle −B relative to the lateral direction 8. The angles +A and −B may be numerically different or equal dependent on the predetermined use and properties of the sheet 26. The sheet 26 is tri-axial meaning that is has three layers 10, 12, 14, which have different main directions. The three layer may be assembled to a sheet form by any known method such as sewing, gluing or by comprising a small amount of thermoplastic fibres, which enables spot-welding of the layers for assembly.

Figure 3:
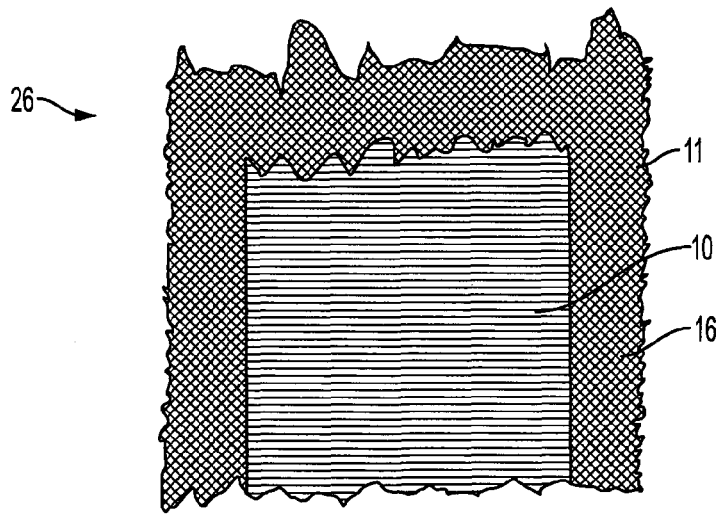
FIG. 3 shows another fibre sheet material according to the invention seen from above.
Figure 5:
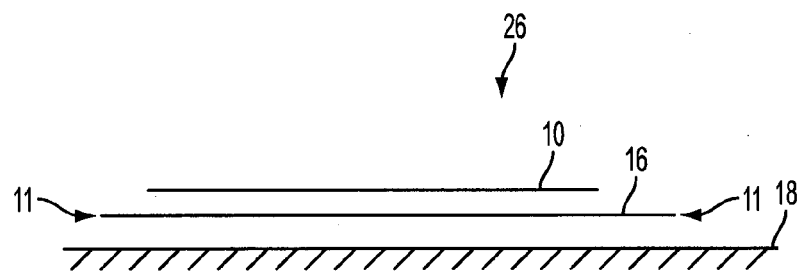
FIG. 5 shows a lateral cross-sectional view of a fibre sheet of FIG. 3.

FIG. 3 shows another embodiment of an oblong fibre sheet material 26 having a surface layer 16 made of a woven bi-axial fibre material with diffused side faces 11, i.e. the side faces 11 are frayed, crushed, grinded, tapered or cut to provide a thinning of a thickness of the layer. A lateral, unidirectional fibre layer 10 is placed on top of the surface layer 16, which is broader than the lateral, unidirectional layer 10, as also shown in FIG. 5, where the sheet 26 is placed on a mould surface 18.

Figure 7:
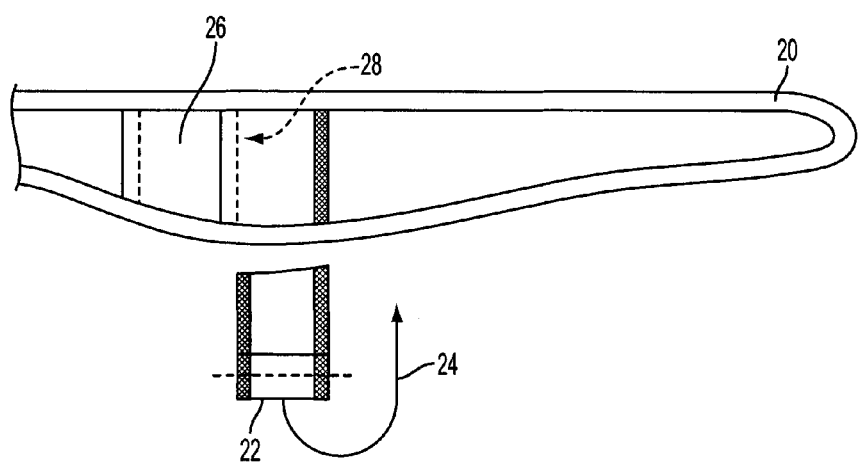
FIG. 7 shows lay-up of fibre sheets material on a roll in a mould seen from above.
Figure 8:
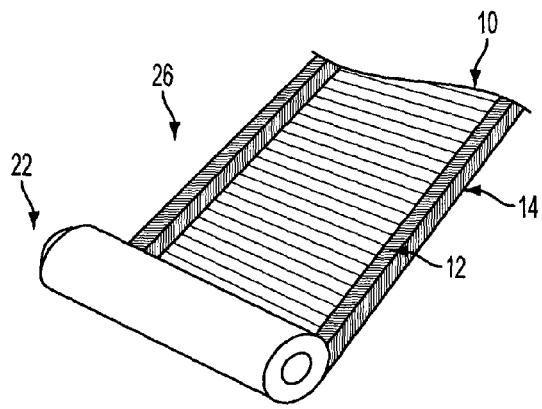
FIG. 8 shows a roll of fibre sheet material.

In FIGS. 7 and 8 the sheet material 26 is shown arranged in a roll. The sheet material may also be pre-cut to fit exact locations on or in a mould.

Figure 6A:
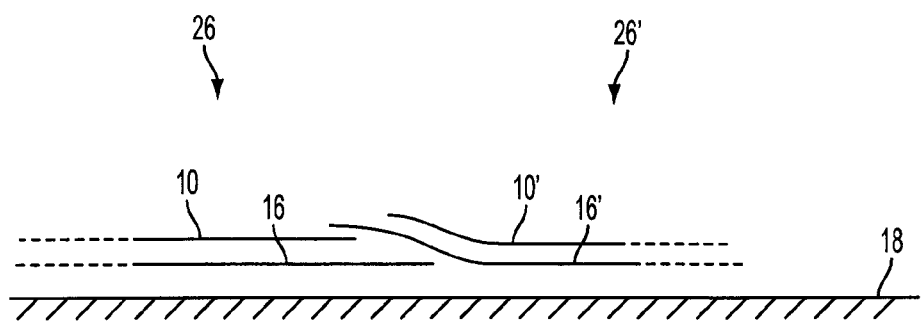
FIG. 6a shows an overlap between two fibre sheets according to FIG. 5.

FIG. 6a shows a method of manufacturing a wind turbine blade aerodynamic surface shell comprising laying fibre sheet materials 26, 26' on a blade mould surface 18, where the sheet materials lengthwise are positioned in a direction corresponding to a chordwise direction of a turbine blade direction of the mould and overlapping in a spanwise direction, and where at least two fibre sheets have the surface layers 16 and 16' facing the mould surface 18. From the left side of FIG. 6a are two fibre layers 16 and 10 located. The layer 16 is broader than the layer 10. From the right side are two fibre layers 16' and 10' located. The layer 16' is broader than the layer 10' and overlaps both layers 10 and 16 of the sheet 26. The layer 10' only overlaps the layer 16 of the sheet 26 and hence there is a minimum of three fibre layers in the overlap. Both layers 16' and 10' could also overlap the layers 10 and 16, but that would thicken the overlap. In the shown manner of overlapping a joint with a low level of stress concentration and thickness is obtained.

Figure 6B:
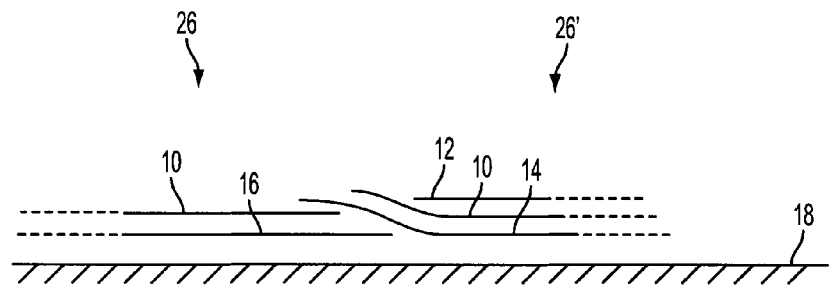
FIG. 6b shows an overlap between two fibre sheets, where the sheets have an uneven number of fibre layers.

FIG. 6b shows a method of manufacturing a wind turbine blade aerodynamic surface shell comprising laying fibre sheet materials 26, 26' on a blade mould surface 18, where the sheet materials lengthwise are positioned in a direction corresponding to a chordwise direction of a turbine blade direction of the mould and overlapping in a spanwise direction. The sheet 26 comprises two fibre layers 10 and 16 and the sheet 26' has three fibre layers 10, 12, 14. The two fibre sheets 26, 26' have the surface layers 16 and 14 facing the mould surface 18. From the left side of FIG. 6a are two fibre layers 16 and 10 located. The layer 16 is broader than the layer 10. From the right side are three fibre layers 14, 10 and 12 located. The layer 14 is broader than the layer 10. The layer 10 is broader than the layer 12. The layer 14 overlaps both layers 10 and 16 of the sheet 26. The layer 10 of the sheet 26' only overlaps the layer 16 of the sheet 26. The layer 12 does not overlap any layer of the sheet 26. Hence there is a minimum of three fibre layers in the overlap. In the shown manner of overlapping a joint with a low level of stress concentration and thickness is obtained. The two overlapping fibre sheets two and three fibre layers, and where the fibre layers are positioned so that at least a number fibre layers corresponding to the sheet 26 with a minimum number of fibre layers are present from both overlapping fibre sheets in a position of overlapping.

FIG. 7 shows manufacturing a wind turbine blade, where a first fibre sheet 28 is laid from a side of the mould 20, which is adapted to shape a leading edge of a turbine blade, and towards the opposite side of the mould 20, which is adapted to shape a trailing edge of a blade, where the sheet material was cut to conform to the mould, and where a side of the sheet, which was cut to conform to the mould, is laid as a second sheet 26 from the part of the mould, which is adapted to shape a trailing edge of a blade, and towards the opposite side of the mould, which is adapted to shape a leading edge of a blade.

Further in FIG. 7 it is shown that a roll 22 with sheet material is given a mainly horizontal U-turn 24 in order to lay a further fibre sheet overlapping the sheet 28, which further sheet is to be laid from a side of the mould 20, which is adapted to shape a trailing edge of a turbine blade, and towards the opposite side of the mould 20, which is adapted to shape a leading edge of a blade.

FIG. 8 shows fibre sheet material 26 in the shape of a roll 22. The sheet material has three fibre layers 14, 10, and 12, where the layer 14 is the broadest and the layer 12 is broader than the lateral, unidirectional layer 10.

Figure 9:
FIG. 9 shows a lateral cross-sectional view of a fibre sheet, where all layers have corresponding length and is not to be used for the present invention.

FIG. 9 shows a fibre sheet 26, where all layers have corresponding length and are not to be used for the present invention.

Figure 10:
FIG. 10 shows a lateral cross-sectional view of a fibre sheet, where the layers have been e.g. cut at angle to obtain a tapering.

FIG. 10 shows a fibre sheet 26, where the layers have been e.g. cut at an angle to obtain a tapering.

Figure 11A:
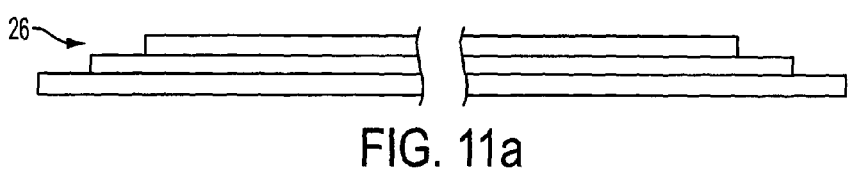
FIG. 11a shows a lateral cross-sectional view of a fibre sheet, where each fibre layer ends abruptly.
Figure 11B:
FIG. 11b shows a lateral cross-sectional view of the fibre sheet of FIG. 11a, where the side faces of each layer have been diffused.

FIGS. 11a,b show fibre sheets 26, wherein FIG. 11a each fibre layer ends abruptly and FIG. 11b shows the fibre sheet of FIG. 11a, where the side faces of each layer have been diffused.

Figure 12:
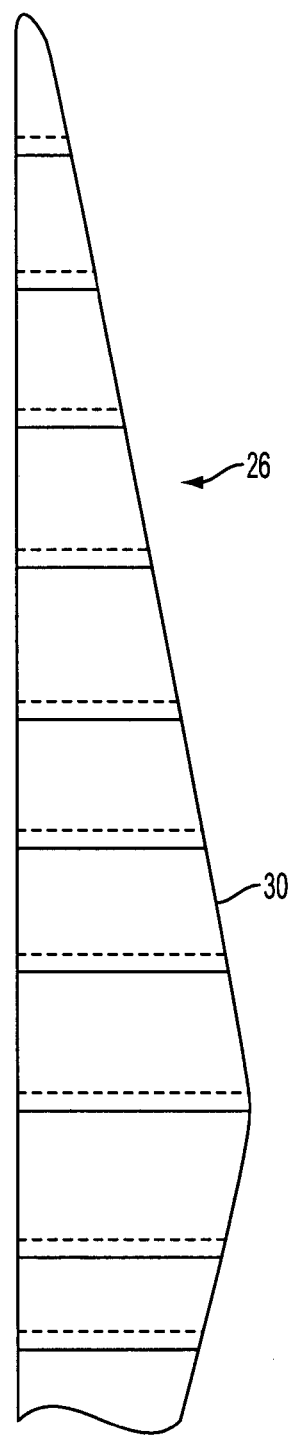
FIG. 12 shows a blade at least partly manufactured by laying fibre sheets laterally and overlapping in a mould.

FIG. 12 shows a blade comprising a number of fibre sheets 26. The fibre sheets may be of similar width or in a number of different widths. E.g. at the area of maximum chord of the blade the sheets may be wide and a transition between the root end and the area of maximum chord the sheets may be less wide. A less wide sheet will ease the laying of the sheet in areas of high degree of double curvature.

The invention is not limited to fibre sheet material with two or more layers and layers of unidirectional, bi-axial or tri-axial fibres. Any multiple number of fibre layers may be used and of any known fibrous material, such as glass, carbon, amide etc.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited or suggested herein as permitted by applicable law. Moreover, any combination of the above-described elements in all possible variations thereof is encompassed by the invention unless otherwise indicated herein or otherwise clearly contradicted by context.

The invention claimed is:

1. A method of manufacturing a wind turbine blade aerodynamic surface shell comprising laying oblong fibre sheet materials in a blade mould, the fibre sheet materials having a lengthwise extension, and a lateral extension being shorter than the lengthwise extension, wherein the sheet materials lengthwise are positioned in a direction corresponding to a chordwise direction of a turbine blade direction of the mould and overlapping in a spanwise direction, and wherein the fibre sheet materials comprise a respective fibre layer in the form of a unidirectional fibre layer having mainly fibres in the lateral direction of the respective fibre sheet material.

2. The method according to claim 1, wherein the fibre sheet material comprises multiple stacked fibre layers including a surface layer, where at least one other fibre layer is the unidirectional fibre layer, and where each layer has lengthwise side faces, and where the surface layer has a width, which in the lateral direction is broader than the unidirectional layer, and where the unidirectional layer is positioned relative to the surface layer such that the surface layer overlaps the unidirectional layer at both lengthwise side faces of the unidirectional layer, and where the lengthwise side faces of at least the surface layer is provided with a thinning of a thickness of the layer.

3. The method according to claim 2, wherein lengthwise side faces of the surface layer and/or the unidirectional layer and/or all the fibre layers are frayed, crushed, grinded, tapered or cut to provide a thinning of a thickness of the layer or layers.

4. The method according to claim 2, wherein the fibre sheet material comprises a further fibre layer positioned on the unidirectional layer, where the unidirectional layer is broader than the further fibre layer.

5. The method according to claim 2, where the surface layer has mainly fibres in a unidirectional direction, which is different from the direction of the fibres in the unidirectional layer.

6. The method according to claim 2, wherein at least two fibre sheets have the surface layers facing the mould.

7. The method according to claim 6, wherein a first fibre sheet is laid from a side of the mould, which is adapted to shape a leading edge of a turbine blade, and towards the opposite side of the mould, which is adapted to shape a trailing edge of a blade, where the sheet material is cut to conform to the mould, and where a side of the sheet, which was cut to conform to the mould, is laid as a second sheet from the part of the mould, which is adapted to shape a trailing edge of a blade, and towards the opposite side of the mould, which is adapted to shape a leading edge of a blade.

8. The method according to claim 2, wherein the fibre sheet is cut to conform to the mould, which is adapted to shape the trailing edge of the blade.

9. The method according to claim 1, wherein at least two fibres sheets are positioned spanwise in a way where at least the unidirectional layer of each sheet and another sheet are positioned overlapping an adjacent unidirectional layer and another layer in a spanwise direction.

10. The method according to claim 1, wherein at least one fibre sheet material is dry and the method comprise infusing the dry fibres with resin.

11. The method according to claim 1, wherein the fibre sheet materials comprise a respective fibre layer having lengthwise side faces parallel with the lengthwise extension of the respective fibre sheet material, where the lengthwise side faces are provided with a thinning of a thickness of the layer.

12. The method according to claim 1, wherein lengthwise side faces of the fibre sheet material are perpendicular to the spanwise direction of the blade.

13. The method according to claim 1, further comprising positioning the fibre sheet in the chordwise direction in the mould such that the unidirectional fibres extend in a spanwise direction of the mould.

* * * * *